United States Patent
Min et al.

(10) Patent No.: US 12,284,179 B2
(45) Date of Patent: Apr. 22, 2025

(54) AUTHENTICATION METHOD AND APPARATUS FOR DEFENDING AGAINST ATTACKS ON UAM AIRCRAFT

(71) Applicants: Hyundai Motor Company, Seoul (KR); Kia Corporation, Seoul (KR)

(72) Inventors: Young Bin Min, Busan (KR); Seung Wook Park, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 208 days.

(21) Appl. No.: 18/187,065

(22) Filed: Mar. 21, 2023

(65) Prior Publication Data

US 2024/0048557 A1    Feb. 8, 2024

(30) Foreign Application Priority Data

Aug. 4, 2022 (KR) .......................... 10-2022-0097085

(51) Int. Cl.
*H04L 9/40* (2022.01)
(52) U.S. Cl.
CPC ...... *H04L 63/0869* (2013.01); *H04L 63/0807* (2013.01)
(58) Field of Classification Search
CPC ............ H04L 63/0869; H04L 63/0807; H04L 2209/84; H04L 9/0825; H04L 9/14;
(Continued)

(56) References Cited

U.S. PATENT DOCUMENTS

2005/0273843 A1* 12/2005 Shigeeda ............ H04L 63/0807
726/5
2014/0380501 A1* 12/2014 Niss ........................ H04L 63/08
726/27
(Continued)

FOREIGN PATENT DOCUMENTS

CN    110661563 A    1/2020
KR    102074292 B1 *  2/2020
(Continued)

*Primary Examiner* — Khalid M Almaghayreh
(74) *Attorney, Agent, or Firm* — Slater Matsil, LLP

(57) ABSTRACT

An embodiment method includes performing pilot authentication based on a first challenge-response process with an authentication server, transmitting first flight information to the authentication server, receiving a first authentication token provided in response to verification of the first flight information in the authentication server, transmitting the first authentication token to an aircraft system, receiving a second authentication token from the aircraft system, the second authentication token being transmitted by the aircraft system to the authentication server when authentication for a security manager boarding the aircraft succeeds based on a second challenge-response process performed between the aircraft system and the authentication server, wherein the second authentication token corresponds to that provided to the aircraft system in response to verification by the authentication server for second flight information, and sharing a session key and a message authentication code key with the aircraft system when mutual authentication succeeds.

16 Claims, 13 Drawing Sheets

(58) Field of Classification Search
CPC ... H04L 9/3213; H04L 9/3234; H04L 9/3271; H04L 9/3273; H04L 63/1441; H04L 67/12; B64U 2201/00; B64U 2201/20; G08G 5/0026; G08G 5/0043; G08G 5/0052; G08G 5/0013; G08G 5/0069; G08G 5/0082; G05D 2107/13; G05D 2109/254; G05D 1/226; H04W 4/40; H04W 12/06; H04W 12/50; H04W 12/63; H04W 12/69; H04W 84/06; G06F 21/31
See application file for complete search history.

(56) References Cited

U.S. PATENT DOCUMENTS

| | | | |
|---|---|---|---|
| 2015/0150095 A1* | 5/2015 | Mere | G01C 23/00 |
| | | | 726/4 |
| 2017/0303123 A1* | 10/2017 | Villar | H04L 67/12 |
| 2018/0103036 A1 | 4/2018 | Fox et al. | |
| 2018/0218619 A1* | 8/2018 | Brown | G08G 5/0013 |
| 2018/0294964 A1* | 10/2018 | Chen | G06F 21/73 |
| 2019/0199534 A1* | 6/2019 | Beaman | H04L 63/08 |
| 2019/0223237 A1* | 7/2019 | Hong | H04L 63/105 |
| 2021/0035457 A1* | 2/2021 | Pennapareddy | G08G 5/0052 |
| 2021/0043096 A1 | 2/2021 | Brown et al. | |
| 2021/0092604 A1* | 3/2021 | Fox | H04L 9/0891 |
| 2022/0051571 A1* | 2/2022 | Iyer | H04L 63/08 |
| 2023/0054770 A1* | 2/2023 | List | G05D 1/2247 |
| 2023/0139748 A1* | 5/2023 | Fox | H04L 63/061 |
| | | | 713/176 |
| 2023/0376049 A1* | 11/2023 | List | B64D 45/00 |

FOREIGN PATENT DOCUMENTS

| | | | | |
|---|---|---|---|---|
| KR | 20200099873 A | * | 8/2020 | |
| WO | WO-2020200410 A1 | * | 10/2020 | ........... H04L 67/125 |

* cited by examiner

AUTHENTICATION METHOD AND APPARATUS FOR DEFENDING AGAINST ATTACKS ON UAM AIRCRAFT

CROSS-REFERENCE TO RELATED APPLICATIONS

This application claims the benefit of Korean Patent Application No. 10-2022-0097085, filed on Aug. 4, 2022, which application is hereby incorporated herein by reference.

TECHNICAL FIELD

The present disclosure relates to an authentication method and apparatus for defending against attacks on an urban air mobility (UAM) aircraft.

BACKGROUND

The content described in this section merely provides background information on the present embodiments and does not constitute the prior art.

An urban air mobility (UAM) is a three-dimensional urban air traffic system that connects ground and air and is a next-generation traffic system that can transport people and cargo over the city. As the UAM market expands, UAMs will offer a new transportation means to the public, thus reducing traffic congestion. Moreover, it facilitates utilization of the city's area, occupied by facilities such as numerous roads and parking lots of the city that currently make ground traffic possible, for other purposes.

With the increased use of aircraft, the degree of risk that may occur in the aircraft may potentially increase. Thus, it is most important to ensure the flight safety of the aircraft for successful commercialization of the UAM. For example, there is a risk of safety accidents due to collisions with other aircraft from a third person, not the pilot, controlling the aircraft by hacking the cockpit that controls the aircraft. Therefore, in order to systematically manage the aircraft, it is necessary to perform the authentication of the pilot and the aircraft, and to allow only an authenticated pilot to control the aircraft.

SUMMARY

The present disclosure relates to an authentication method and apparatus for defending against attacks on an urban air mobility (UAM) aircraft. Particular embodiments relate to an authentication method and apparatus for defending against attacks on a UAM aircraft, which use two-channel authentication and mutual authentication between a pilot and a security manager, thus defending against the attacks of an attacker.

Embodiments of the present disclosure provide a method and apparatus for authenticating a user using an internet network.

Further, embodiments of the present disclosure provide a method and apparatus for mutual authentication between users using a command and control (C2) link.

Further, embodiments of the present disclosure provide a method and apparatus for preventing a UAM aircraft from being controlled by an attacker.

Further, embodiments of the present disclosure provide a method and apparatus for encrypting piloting-related data.

The problems solvable by embodiments of the present disclosure are not limited to the above-mentioned problems, and other problems which are not mentioned will be clearly understood by those skilled in the art from the following description.

According to embodiments of the present disclosure, a method performed by a pilot terminal assisting a pilot to remotely control an aircraft may include performing pilot authentication based on a first challenge-response process with an authentication server, transmitting first flight information to the authentication server and receiving a first authentication token provided in response to the verification of the first flight information in the authentication server, transmitting the first authentication token to the aircraft system and receiving a second authentication token from the aircraft system, the second authentication token being transmitted by the aircraft system to the authentication server when authentication for a security manager boarding the aircraft succeeds based on a second challenge-response process performed between the aircraft system and the authentication server, wherein the second authentication token corresponds to that provided to the aircraft system in response to verification by the authentication server for the second flight information, and sharing a session key and a message authentication code (MAC) key, which will be used to transmit remote control related data, with the aircraft system, when mutual authentication between the pilot terminal and the aircraft system, which is performed based on the first authentication token and the second authentication token, succeeds.

According to embodiments of the present disclosure, a method performed by an aircraft system assisting a pilot to remotely control an aircraft may include performing authentication for a security manager boarding the aircraft, based on a first challenge-response process with an authentication server, transmitting first flight information to the authentication server and receiving a first authentication token provided in response to the verification of the first flight information in the authentication server, transmitting the first authentication token to a pilot terminal controlled by the pilot who remotely controls the aircraft and receiving a second authentication token from the pilot terminal, the second authentication token being transmitted by the pilot terminal to the authentication server when authentication for the pilot succeeds based on a second challenge-response process performed between the pilot terminal and the authentication server, wherein the second authentication token corresponds to that provided to the pilot terminal in response to verification by the authentication server for the second flight information, and sharing a session key and a MAC key, which will be used to transmit remote control related data, with the pilot terminal, when mutual authentication between the pilot terminal and the aircraft system, which is performed based on the first authentication token and the second authentication token, succeeds.

According to embodiments of the present disclosure, a pilot terminal assisting a pilot to remotely control an aircraft may correspond to a memory and a processor configured to perform pilot authentication based on a first challenge-response process with an authentication server, transmit first flight information to the authentication server and receive a first authentication token provided in response to the verification of the first flight information in the authentication server, transmit the first authentication token to the aircraft system and receive a second authentication token from the aircraft system, wherein the second authentication token corresponds to that provided to the aircraft system in response to verification by the authentication server for the second flight information and is transmitted by the aircraft system to the authentication server when authentication for a security manager boarding the aircraft succeeds based on a second challenge-response process performed between the aircraft system and the authentication server and share a session key and a MAC key, which will be used to transmit remote control related data, with the aircraft system, when mutual authentication between the pilot terminal and the aircraft system, which is performed based on the first authentication token and the second authentication token, succeeds.

According to embodiments of the present disclosure, an aircraft system assisting a pilot to remotely control an aircraft may correspond to a processor, wherein the processor is configured to perform authentication for a security manager boarding the aircraft, based on a first challenge-response process with an authentication server, transmit first flight information to the authentication server and receive a first authentication token provided in response to the verification of the first flight information in the authentication server, transmit the first authentication token to a pilot terminal controlled by a pilot who remotely controls the aircraft and receive a second authentication token from the pilot terminal, wherein the second authentication token corresponds to that provided to the pilot terminal in response to verification by the authentication server for the second flight information and is transmitted by the pilot terminal to the authentication server when authentication for the pilot succeeds based on a second challenge-response process performed between the pilot terminal and the authentication server, and share a session key and a MAC key, which will be used to transmit remote control related data, with the pilot terminal, when mutual authentication between the pilot terminal and the aircraft system, which is performed based on the first authentication token and the second authentication token, succeeds.

According to embodiments of the present disclosure, it is possible to provide a method and apparatus for authenticating a user using an internet network.

Further, according to embodiments of the present disclosure, it is possible to provide a method and apparatus for mutual authentication between users using a C2 link.

Further, according to embodiments of the present disclosure, it is possible to provide a method and apparatus for preventing a UAM aircraft from being controlled by an attacker.

Further, according to embodiments of the present disclosure, it is possible to provide a method and apparatus for encrypting piloting-related data.

Effects that can be obtained by embodiments of the present disclosure are not limited to the above-mentioned effects, and other effects which are not mentioned will be clearly understood by those skilled in the art from the following description.

DETAILED DESCRIPTION OF ILLUSTRATIVE EMBODIMENTS

Figure 1:
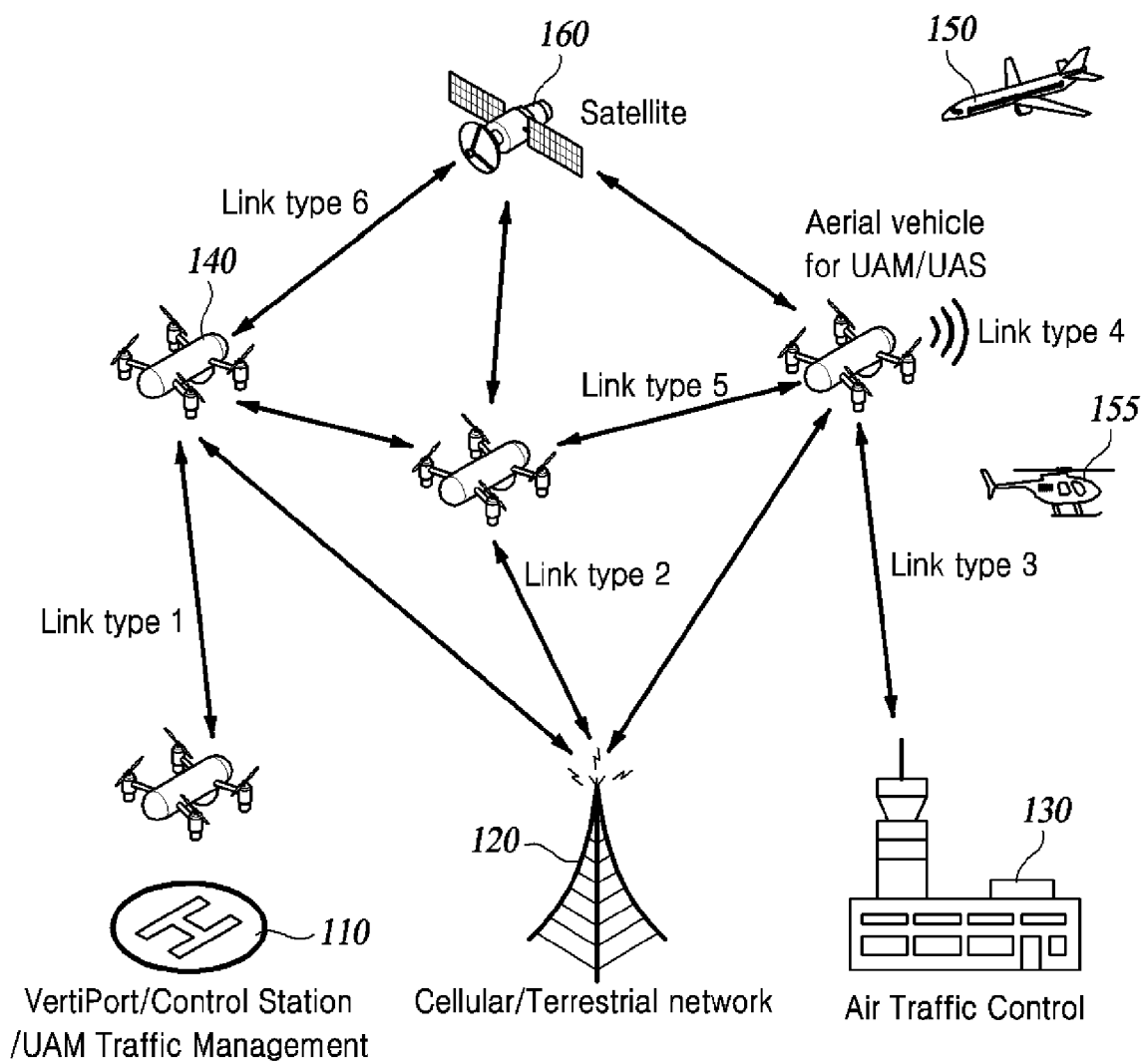
FIG. 1 is a diagram for describing a communication link type of an urban air mobility (UAM) service.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or the sequence of the components. Throughout this specification, when parts "include" or "comprise" a component, they are meant to further include other components, not excluding thereof unless there is a particular description contrary thereto.

The following detailed description along with the accompanying drawings are to describe exemplary embodiments of the present disclosure and are not to present the only embodiments of the present disclosure.

FIG. 1 is a diagram for describing a communication link type of an urban air mobility (UAM) service. Aircraft may be classified into conventional take off and landing (CTOL), short take off and landing (STOL), and vertical take off and landing (VTOL) according to the length of a takeoff and landing runway. The CTOL requires a long runway for taking off and landing, and each of the STOL and the VTOL requires a short runway or does not require a runway at all. Electrical vertical take off and landing (E-VTOL) is a technology in which an aircraft vertically takes off and lands using electric power. The E-VTOL may be used for UAM or advanced air mobility (AAM) services in urban areas. The E-VTOL is characterized by vertical takeoff and landing, lift electrification, rotor rotation, autopilot, semi-autopilot, and remote pilot. Passenger transport including taxiplanes, emergency purposes such as rescue and first aid, recreational activities and cargo delivery services, etc. may be envisioned as application programs for UAM and AAM services.

An unmanned or remotely controlled aircraft with a specific purpose, such as cargo transport, atmospheric research, or surveillance, may be classified as an unmanned aircraft system (UAS).

The E-VTOL may use various communication links and types including traditional air traffic communication, automatic dependent surveillance-broadcast (ADS-B), global navigation satellite system (GNSS), cellular networks, and command and control (C2) and satellite communication so as to provide safe and accurate aviation and broadband services from an aircraft. Air traffic communication may be used to prevent interference in a control area between aircraft and between an aircraft and an obstacle and to maintain order in air traffic. ADS-B may be used for air traffic control by transmitting location information to another aircraft and an air traffic control station using a very high frequency (VHF) frequency bandwidth. Vehicle to vehicle (V2V) may be used for aircraft-to-aircraft communication to share information between aircraft and prevent collisions between aircraft using cellular networks.

GNSS may correspond to global positioning, navigation, and timing determination functions available to one or more satellites. GNSS may be augmented by ground stations or stationary satellites to improve integrity and location accuracy. Satellite communication (SatCom) may be used to provide broadband services in aircraft cabins using satellite communication channels. Cellular communication may be used to provide broadband services in aircraft cabins and to provide command and control communications using cellular network channels. Wi-Fi may be used to provide broadband services in aircraft cabins through SatCom or cellular networks. C2 may correspond to a data link between a remote piloted aircraft and a remote pilot for flight management.

Referring to FIG. 1, a control station 110 and a UAM aircraft 140 may transmit and receive control information, control commands, and flight information using link type 1. The link type 1 may include C2, cellular communication, etc. A cellular network 120 and the UAM aircraft 140 may transmit and receive control information, control command, and broadband data using link type 2. The link type 2 may include cellular communication. The air traffic control station 130 and the UAM aircraft 140 may transmit and receive flight information using link type 3. The link type 3 may include air traffic communication.

The UAM aircraft 140 may transmit and receive flight information to and from an airplane 150 and a helicopter 155 using link type 4. The link type 4 may include ADS-B. The UAM aircraft 140 may transmit and receive flight information to and from each other using link type 5. The link type 5 may include V2V and ADS-B. The UAM aircraft 140 and a satellite 160 may transmit and receive time information, location information, control command, control information, and broadband data to and from each other using link type 6. The link type 6 may include GNSS, C2, and SatCom.

Figure 2:
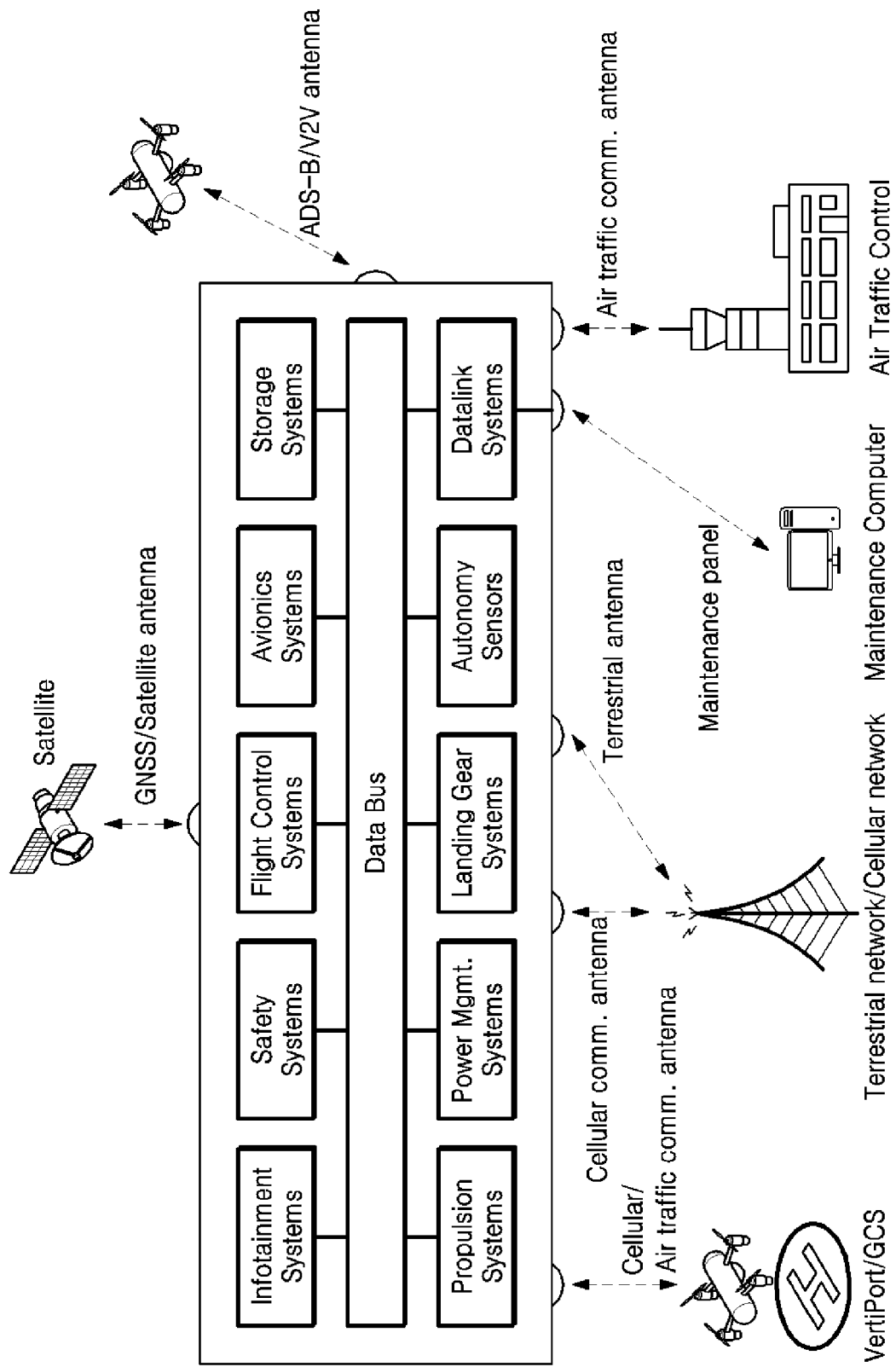
FIG. 2 is a diagram for describing a network and system structure of a UAM aircraft.

FIG. 2 is a diagram for describing a network and system structure of a UAM aircraft. Various types of antennas for communicating with external entities are provided on the surface of the UAM aircraft. The aircraft system structure connected to a data bus is provided inside the UAM aircraft.

Referring to FIG. 2, the UAM aircraft has on a surface thereof various types of antennas to communicate with satellites, other UAM aircraft, air traffic control stations, maintenance computers, cellular networks, and GCS. Data buses, infotainment systems, datalink systems, storage systems, flight control systems, autonomous sensors, propulsion systems, emergency systems, landing gear systems, power management systems, avionics systems, security manager terminals, and maintenance panels may be present in the system of the UAM aircraft. A security manager boarding the UAM aircraft may monitor or access the system of the UAM aircraft.

The data bus may be used for an in-flight network to transmit massive data between various systems. The infotainment system may be used to provide in-cabin entertainment services. The data link system may be used to provide communication functions inside and outside the UAM aircraft. The data link system may be communicatively connected to the pilot terminal to transmit or receive various pieces of information. The storage system may be used to manage various storage systems used in the aircraft.

The flight control system may be used for flight controls, connecting links, and actuation mechanisms required for controlling the direction of the aircraft during flight. The autonomous sensor may be used for various cameras and sensors inside and outside the aircraft. The propulsion system may be used to control parts of the aircraft. The emergency system may be used to provide a safety function for passengers and emergency situations. The landing gear system may be used for the takeoff and landing of the aircraft. The power management system may be used to control the power of the aircraft. The avionics system may include system integration, data logging, navigation assistance and collision avoidance functions. The maintenance panel may be used to maintain, diagnose and download flight logs and software updates.

Figure 3A:
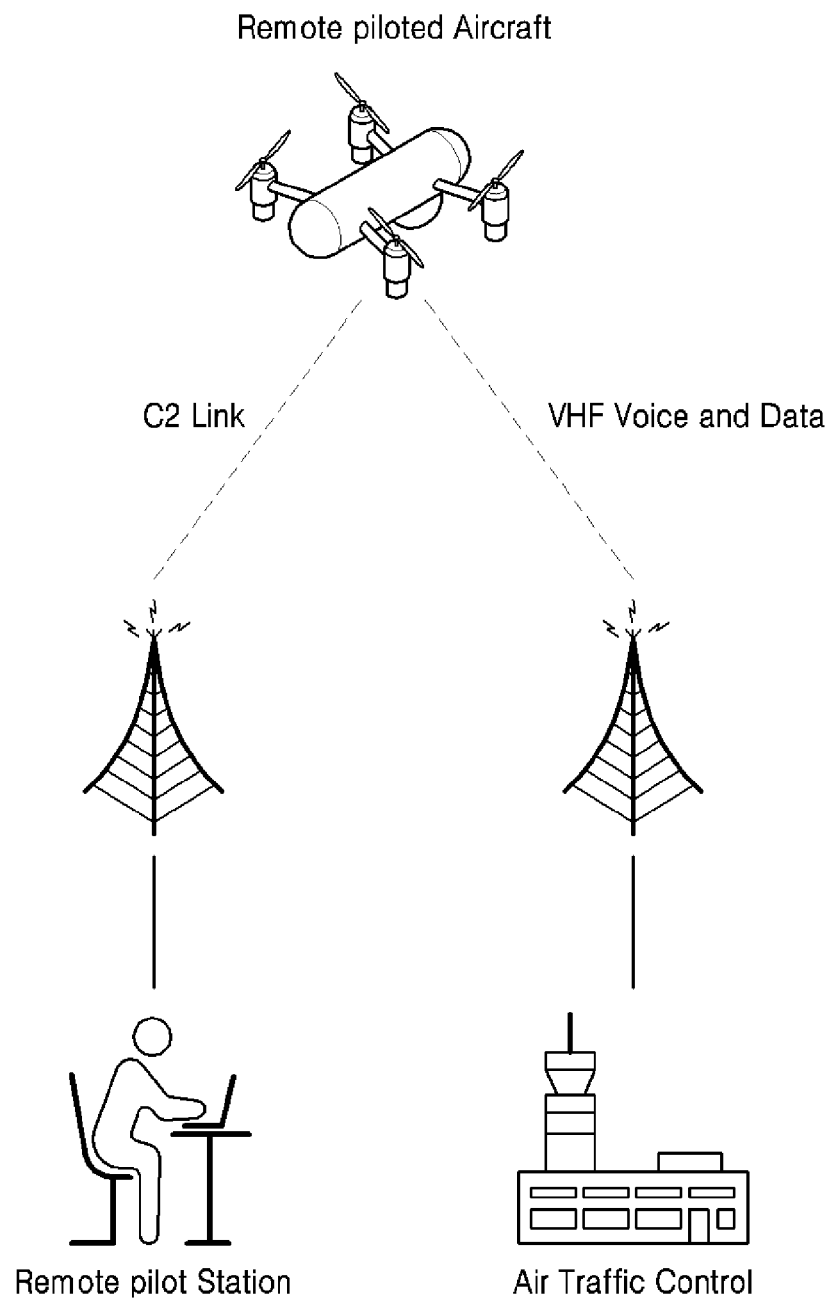
FIGS. 3A and 3B are diagrams for describing a system for remotely piloting a UAM aircraft.
Figure 3B:
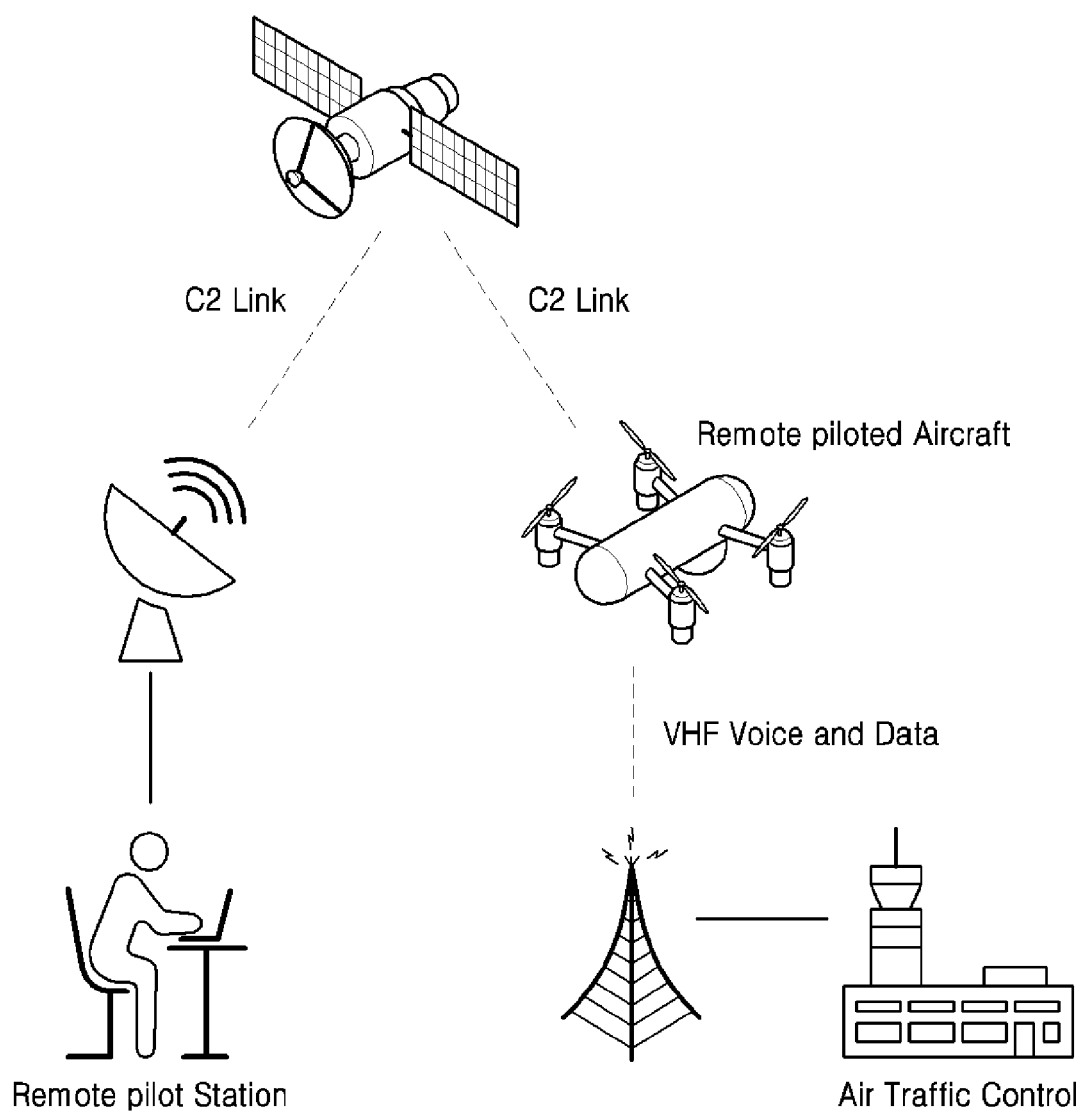

FIGS. 3A and 3B are diagrams for describing a system for remotely piloting the UAM aircraft. A pilot may remotely pilot the UAM aircraft via radio communication. A remote piloted aircraft system may consider radio line of sight (RLOS) and beyond radio line of sight (BRLOS) situations.

Referring to FIG. 3A, in the RLOS situation, a remote pilot station may control a remotely piloted aircraft through a C2 link. A pilot may operate the authenticated UAM aircraft. A security manager may board the UAM aircraft to manage passengers and ensure safety. In the RLOS situation, the remotely piloted aircraft may transmit and receive information to and from the air traffic control station using the VHF frequency bandwidth. In the RLOS situation, the remote pilot station and the air traffic control station may directly communicate with the UAM aircraft and may visually check the status of the aircraft.

Referring to FIG. 3B, in the BRLOS situation, communication is delayed and the status of the UAM aircraft may not be checked by the pilot's view. In the BRLOS situation, the remote pilot station may transmit and receive information to and from the satellite using the C2 link. In the BRLOS situation, the satellite may transmit and receive information to and from the remotely piloted aircraft using the C2 link. In the BRLOS situation, the remotely piloted aircraft may transmit and receive information to and from the air traffic control station using the VHF frequency bandwidth.

Figure 4:
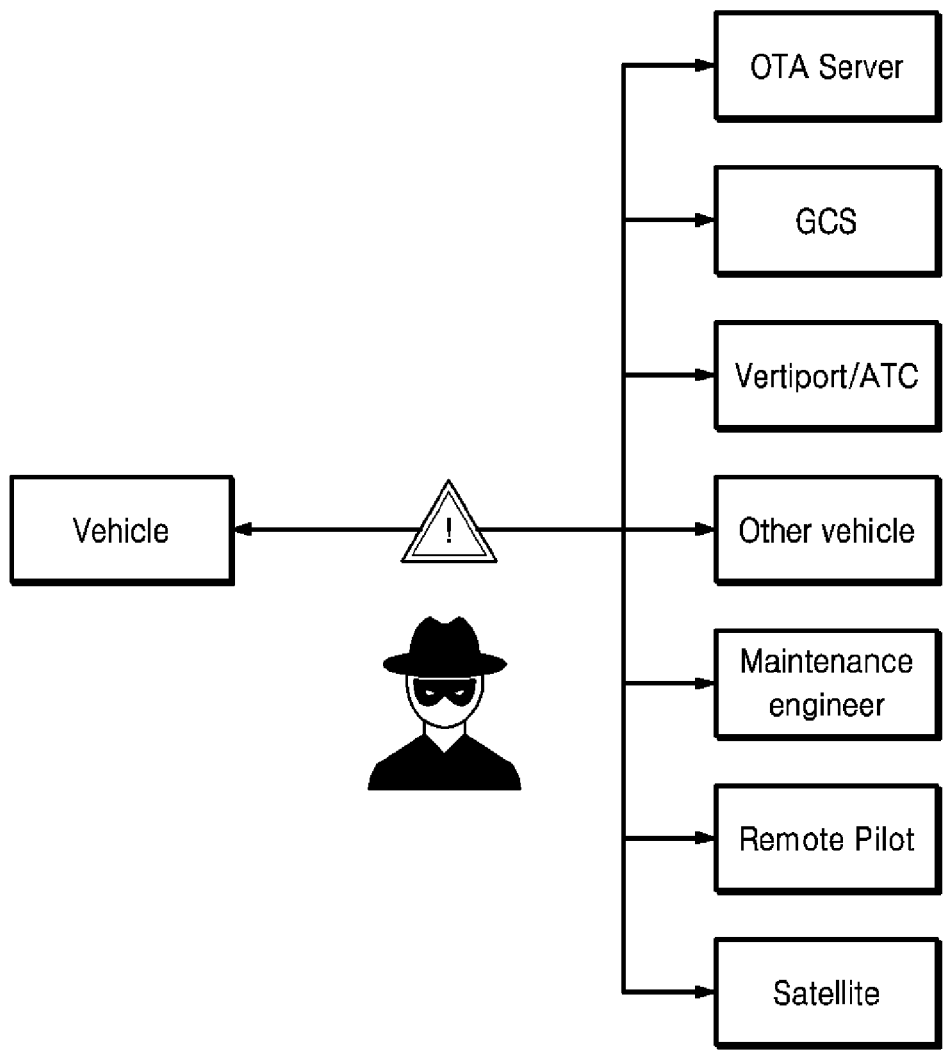
FIG. 4 is a diagram for describing a relationship between a UAM aircraft, an attacker, and an external entity.

FIG. 4 is a diagram for describing a relationship between the UAM aircraft, an attacker, and an external entity.

Referring to FIG. 4, the attacker may eavesdrop on communication data between a vehicle and the external entity. Thus, UAM control commands, status information, update packages, etc. may be exposed. The attacker may obtain private data or use the data for further attacks. The vehicle may include UAM aircraft, vehicles, drones, robots, etc.

Figure 5:
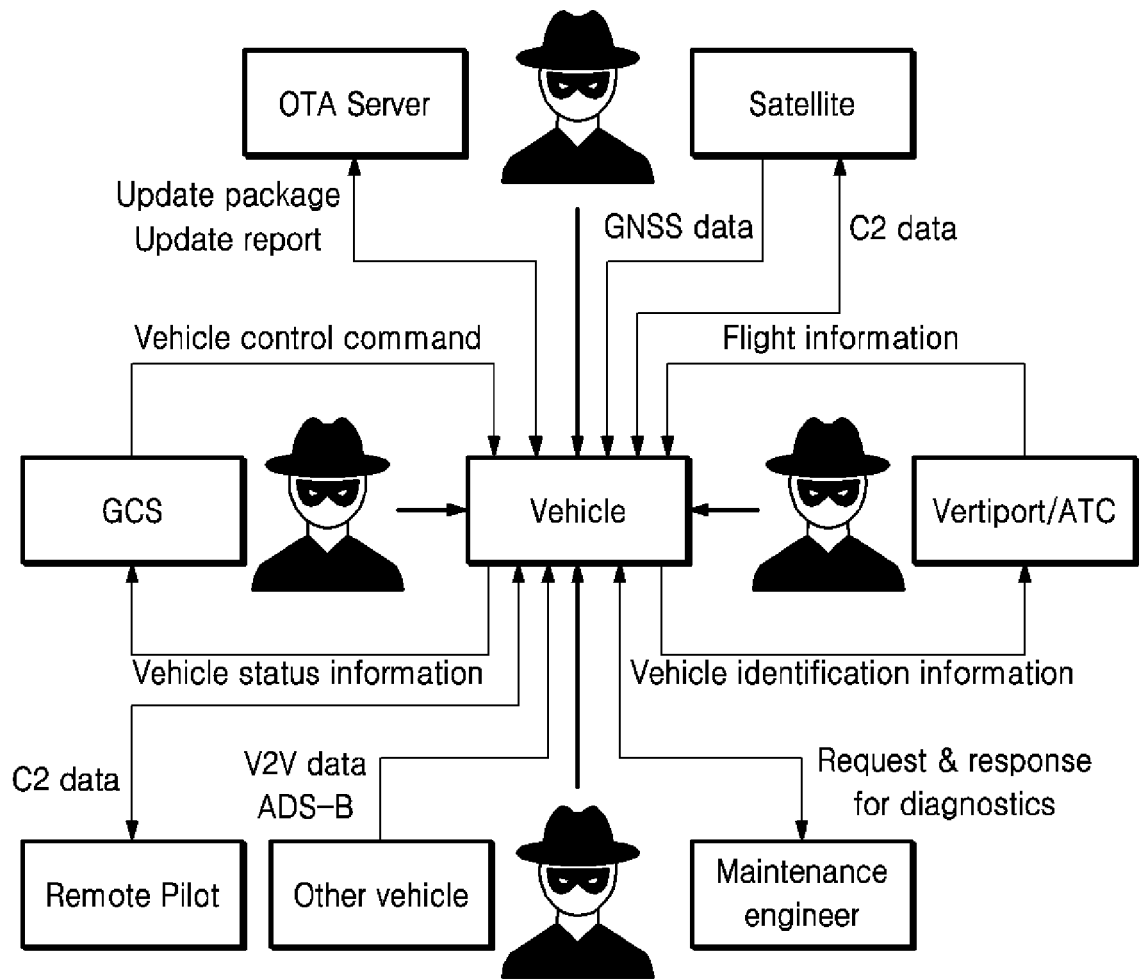
FIG. 5 is a diagram for describing a threat through the impersonation of an attacker.

FIG. 5 is a diagram for describing a threat through the impersonation of an attacker.

Referring to FIG. 5, the attacker may impersonate other entities such as GCS, remote pilots, other vehicles, maintenance engineers, control stations, air traffic control stations, satellites, and over the air programming (OTA) servers to control the vehicle. The attacker may impersonate the GCS and give UAM aircraft control commands to the vehicle. The attacker may impersonate the remote pilot and send information to the vehicle. The attacker may impersonate another UAM aircraft and send information to the vehicle. The attacker may impersonate a maintenance engineer and send a request and response information about diagnostics to the vehicle. The attacker may impersonate the control station or the air traffic control station and send flight information to the vehicle. The attacker may impersonate the satellite and send information to the vehicle. The attacker may impersonate an OTA server and send update packages and reports to the vehicle. Accordingly, the vehicle should receive information from another entity that is authenticated in security and trusted. Here, the vehicle may include UAM aircraft, vehicles, drones, robots, etc.

Figure 6:
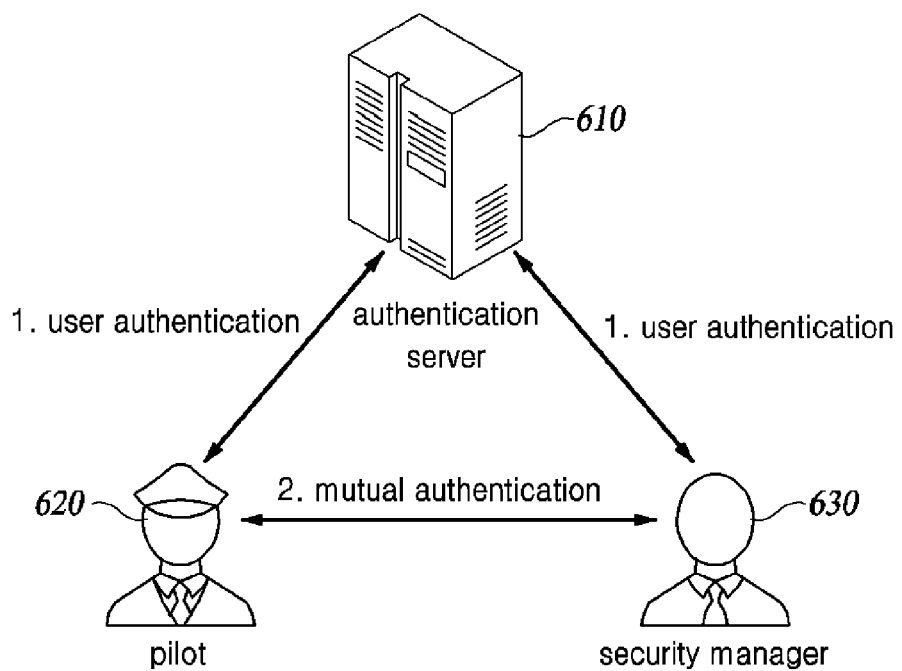
FIG. 6 is a diagram for describing an authentication system for defending against attacks on a UAM aircraft, according to an embodiment of the present disclosure.

FIG. 6 is a diagram for describing an authentication system for defending against attacks on a UAM aircraft, according to an embodiment of the present disclosure. Remote control, data transmission, and authentication process performed by the pilot may be performed through the pilot terminal. The pilot may control the pilot terminal. Data transmission, safety management tasks, and authentication processes performed by the security manager may be performed through the aircraft system. The security manager may control the aircraft system.

Referring to FIG. 6, a pilot 620 may remotely pilot the UAM aircraft. A security manager 630 may board the aircraft and perform safety management tasks. The pilot 620 may perform authentication by transmitting authentication request data to an authentication server 610. The security manager 630 may perform authentication by transmitting authentication request data to an authentication server 610. The pilot 620 and the security manager 630 may perform mutual authentication.

Figure 7:
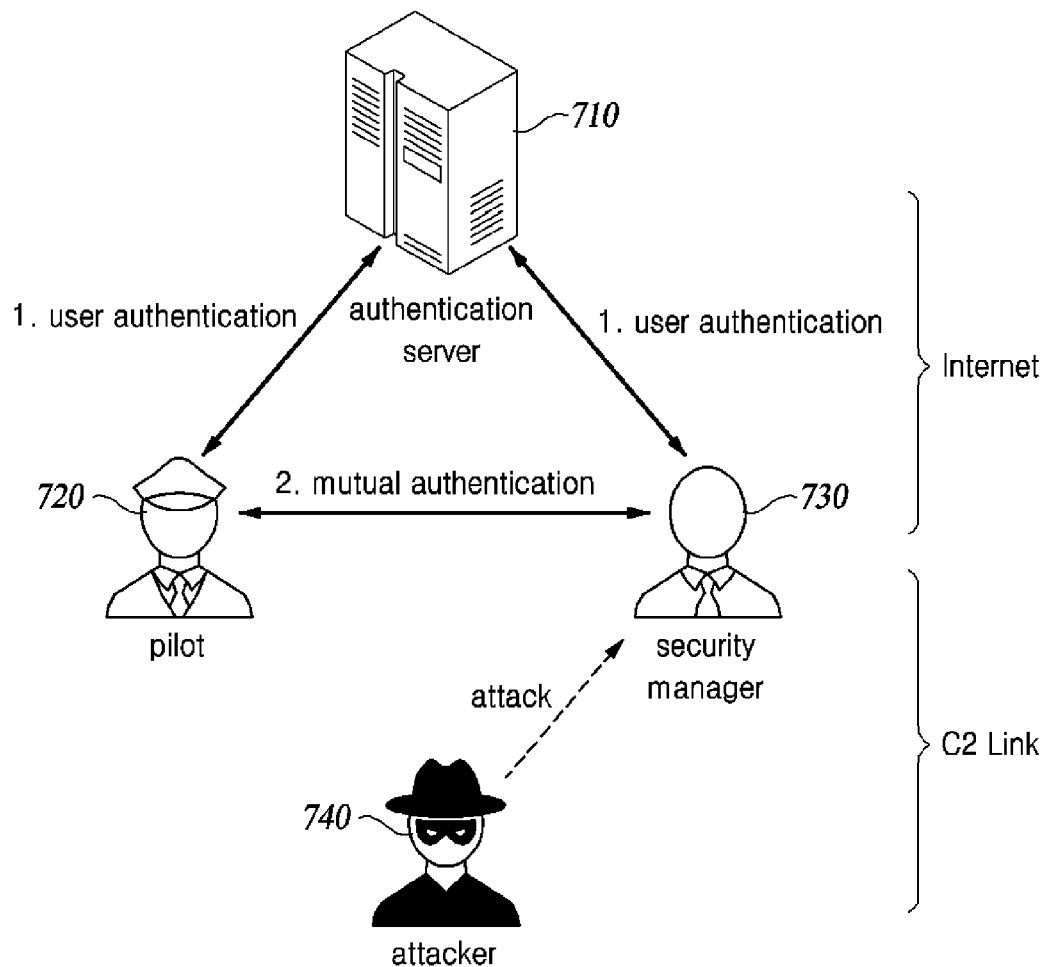
FIG. 7 is a diagram for describing a situation in which an attacker attacks a UAM aircraft, according to an embodiment of the present disclosure.

FIG. 7 is a diagram for describing a situation in which an attacker attacks the UAM aircraft, according to an embodiment of the present disclosure.

Referring to FIG. 7, the authentication of a pilot 720 through an authentication server 710 may be performed through a wired/wireless internet network. The authentication of a security manager 730 through the authentication server 710 may be performed through an internet network. The mutual authentication between the pilot 720 and the security manager 730 may be performed through a C2 link. The C2 link may correspond to a communication channel connecting the pilot 720 and the security manager 730. The pilot 720 may remotely pilot the aircraft through the C2 link. An attacker 740 may pretend to be the pilot 720 and transmit a control message to the aircraft. Through this attack, the attacker 740 may control the aircraft. In order to defend against the threat of the attacker 740, the process of authenticating the pilot 720 before operating the aircraft may be performed. The pilot 720 may transmit authentication information to the aircraft together with flight information. When the attacker 740 transmits the control message to the aircraft without authentication information, the aircraft may recognize the control message as that of the attacker 740. Thus, it is possible to prevent the attacker 740 from controlling the aircraft.

Figure 8:
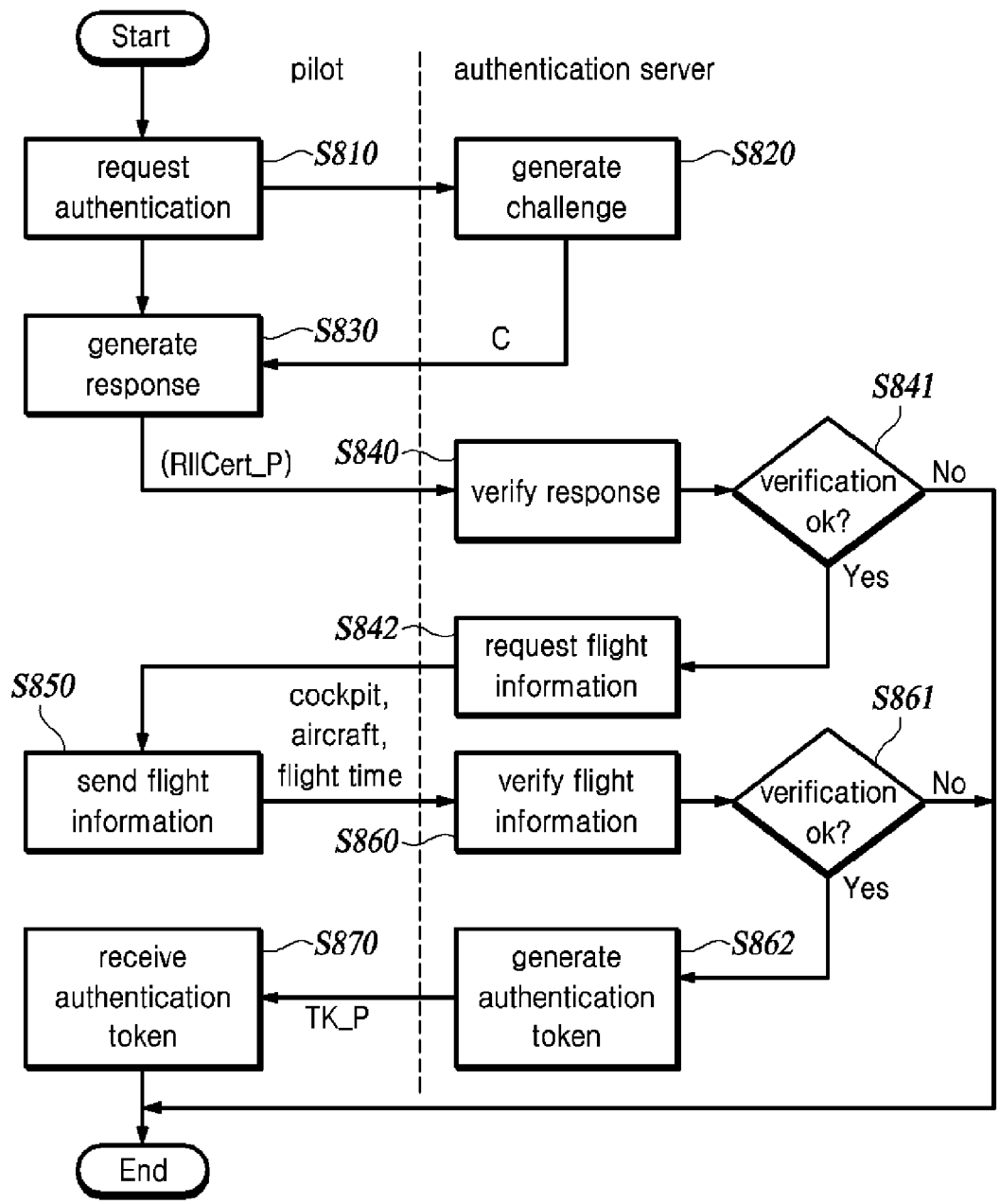
FIG. 8 is a diagram for describing a pilot authentication process, according to an embodiment of the present disclosure.

FIG. 8 is a diagram for describing a pilot authentication process, according to an embodiment of the present disclosure. A pilot may perform an authentication process through an authentication server. The pilot may perform authentication using a pilot terminal. The authentication method using ID and password is vulnerable to retransmission attacks. The challenge and response authentication method may correspond to a one-time authentication method to compensate for this vulnerability. When a user desires to perform authentication, the server may send a one-time challenge to the user. The user may encrypt it with a secret key and send a response to the server. Here, the challenge may not be predicted with a one-time random number and may be changed to a different value each time. Since the challenge is changed to a different value each time, the attacker may not reuse a response even if the attacker sniffs the response in the middle.

Referring to FIG. 8, when the pilot performs authentication through the authentication server, the pilot has already been issued a certificate from the authentication server and is in the state of performing aircraft operation in a designated cockpit. Further, when the pilot performs authentication through the authentication server, the authentication server already has the pilot's identity information because the pilot is already registered in the authentication server and also the flight information to be performed by the pilot.

In the cockpit, the pilot may request authentication from the authentication server (S810). The pilot may request authentication by transmitting authentication request data to the authentication server. The authentication server may generate a challenge according to the pilot's authentication request data and send the generated challenge to the pilot (S820). Once the pilot receives the challenge, a response may be generated and the generated response may be sent to the authentication server (S830). The response may correspond to an electronic signature for the challenge. The pilot may send the response to the authentication server by entering a password for a certificate.

The authentication server may receive the response and verify the corresponding response (S840). The authentication server may determine whether the response is verified or not (S841). The response may be verified using the pilot's certificate. When the response is not verified (S841—NO), the pilot's authentication process is completed and the pilot's authentication may fail. When the response is verified (S841—YES), the authentication server may request flight information from the pilot (S842). The authentication server may request flight information from the pilot by transmitting flight-information request data to the pilot. The authentication server may ask the pilot to select and transmit a flight to be performed. The pilot may send the flight information to the authentication server (S850). Here, the flight information may include flight time, cockpit information, aircraft information, flight route, etc.

The authentication server may receive the flight information and verify the corresponding flight information (S860). The authentication server may determine whether the flight information is verified (S861). When the flight information is not verified (S861—NO), the pilot's authentication process is completed and the pilot's authentication may fail. When the flight information is verified (S861—YES), the authentication server may generate a pilot's authentication token and send the corresponding authentication token to the pilot (S862). Here, the authentication token may include pilot information, cockpit information, aircraft information indicated by serial number, and expiration date. The pilot may receive the authentication token from the authentication server (S870). Further, the pilot authentication process is completed and the pilot's authentication may succeed.

Figure 9:
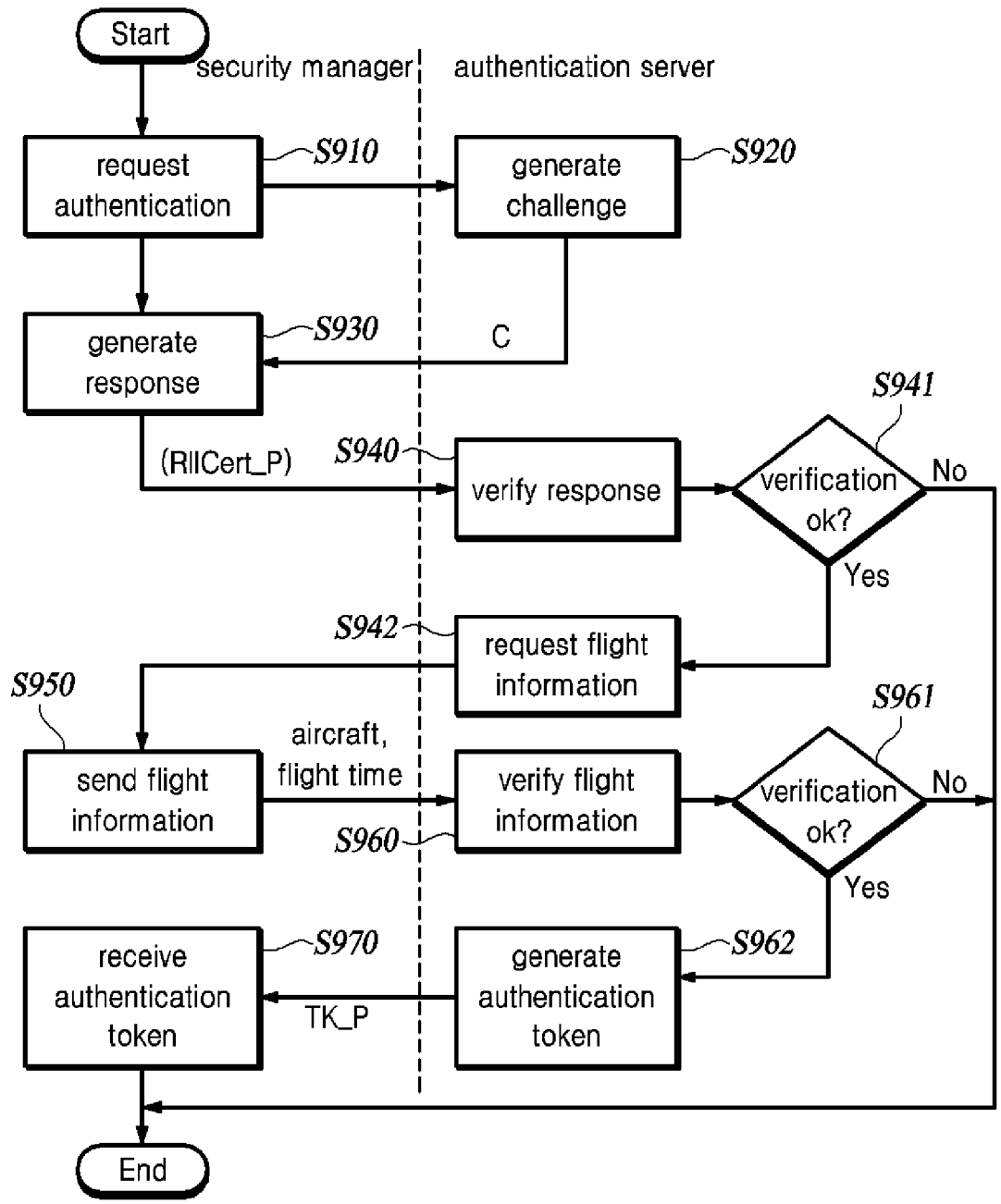
FIG. 9 is a diagram for describing a security manager authentication process, according to an embodiment of the present disclosure.

FIG. 9 is a diagram for describing a security manager authentication process, according to an embodiment of the present disclosure. A security manager may board the aircraft. The security manager may perform the authentication process using the aircraft system in the aircraft.

Referring to FIG. 9, when the security manager performs authentication through the authentication server, the security manager has already been issued a certificate from the authentication server and is in the state of boarding the aircraft and using the system of the aircraft. Further, when the security manager performs authentication through the authentication server, the authentication server already has the identity information of the security manager because the security manager is already registered in the authentication server and also the flight information to be performed by the security manager.

The security manager may request authentication from the authentication server in the aircraft (S910). The security manager may request authentication from the authentication server by transmitting authentication request data to the authentication server. The authentication server may generate a challenge according to the security manager's authentication request and send the generated challenge to the security manager (S920). Once the security manager receives the challenge, a response may be generated and the generated response may be sent to the authentication server (S930). The response may correspond to an electronic signature for the challenge. The security manager may send the response to the authentication server by entering a password for a certificate.

The authentication server may receive the response and verify the corresponding response (S940). The authentication server may determine whether the response is verified or not (S941). The response may be verified using the security manager's certificate. When the response is not verified (S941—NO), the security manager's authentication process is completed and the security manager's authentication may fail. When the response is verified (S941—YES), the authentication server may request flight information from the security manager (S942). The authentication server may request flight information from the security manager by transmitting flight-information request data to the security manager. The authentication server may ask the security manager to select and transmit a flight to be performed. The security manager may send the flight information to the authentication server (S950). Here, the flight information may include flight time, cockpit information, aircraft information, flight route, etc.

The authentication server may receive the flight information and verify the corresponding flight information (S960). The authentication server may determine whether the flight information is verified (S961). When the flight information is not verified (S961—NO), the security manager's authentication process is completed and the security manager's authentication may fail. When the flight information is verified (S961—YES), the authentication server may generate a security manager's authentication token and send the corresponding authentication token to the security manager (S962). Here, the authentication token may include pilot information, cockpit information, aircraft information indicated by serial number, and expiration date. The security manager may receive the authentication token from the authentication server (S970). Further, the security manager authentication process is completed and the security manager's authentication may succeed.

Figure 10:
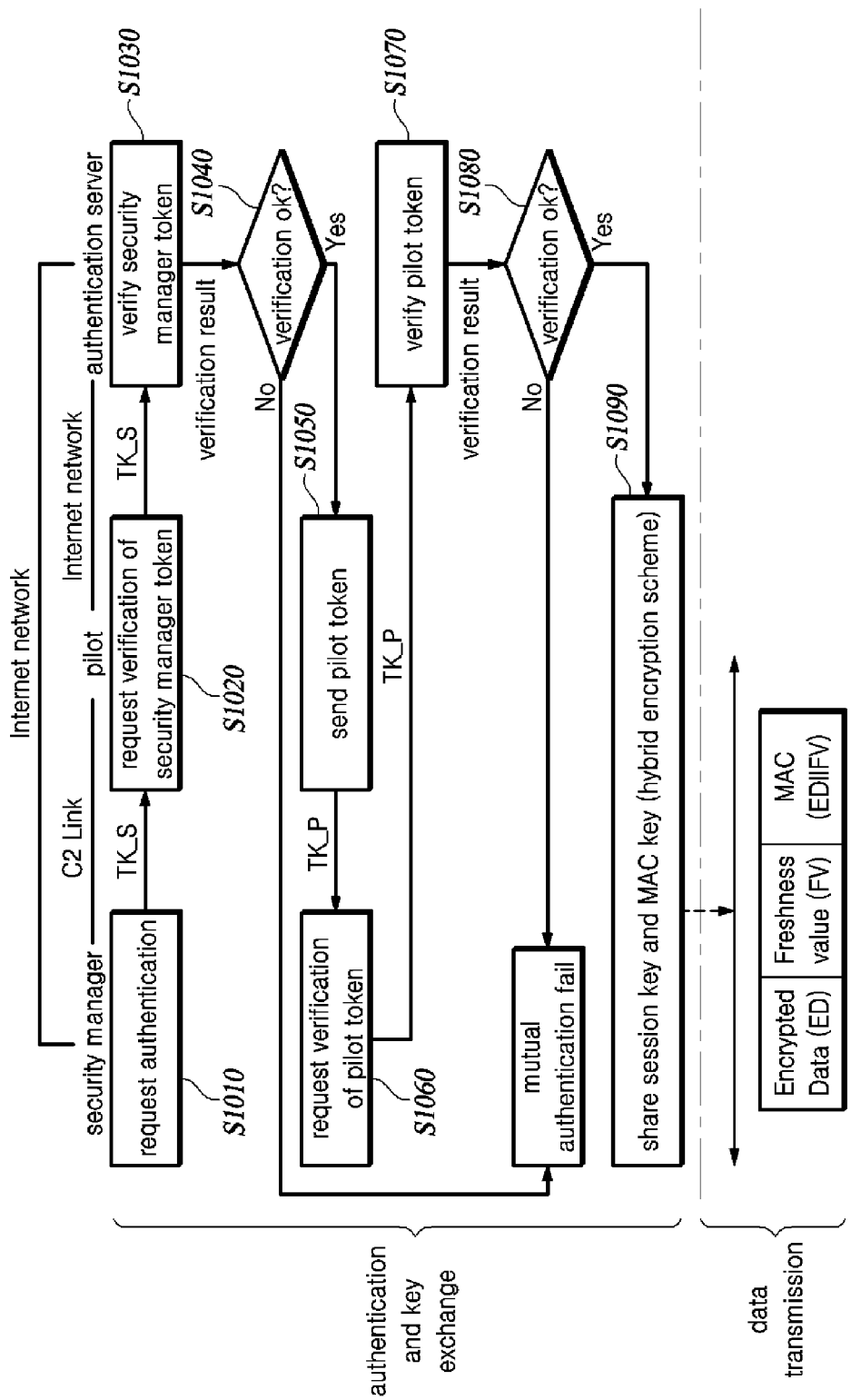
FIG. 10 is a diagram for describing a mutual authentication process between a pilot and a security manager, according to an embodiment of the present disclosure.

FIG. 10 is a diagram for describing a mutual authentication process between a pilot and a security manager, according to an embodiment of the present disclosure. A symmetric encryption technique is an encryption technique in which a key used for encryption and a key used for decryption are the same. An asymmetric encryption technique is an encryption technique in which an encryption key and a decryption key are different. The symmetric encryption technique has a problem of hacking in a key delivery process. The asymmetric encryption technique is slower than the symmetric encryption technique and is weak against a man-in-the-middle attack (MITM). A hybrid encryption technique may correspond to a combination of the symmetric encryption technique and the asymmetric encryption technique. As for the hybrid encryption technique, information may be encrypted by a session key. The session key may be generated by a pseudo-random number generator. The session key may be encrypted by a public key. The public key may be granted from outside a hybrid encryption system. The mutual authentication process between the pilot and the security manager may be performed using the pilot terminal and the aircraft system.

Referring to FIG. 10, the security manager may request authentication from the pilot (S1010). The security manager may request authentication from the pilot by sending the authentication request data to the pilot. The pilot may be located in the cockpit. The security manager may send the security manager's authentication token to the pilot along with the authentication request. The pilot may request verification of the received security manager's authentication token from the authentication server (S1020). The pilot may make a verification request to the authentication server by sending the verification request data on the security manager's authentication token to the authentication server. The authentication server may verify the security manager's authentication token (S1030).

The authentication server may determine whether the security manager's authentication token is verified (S1040). When the security manager's authentication token is not verified (S1040—NO), the mutual authentication between a user and the security manager may fail. When the security manager's authentication token is verified (S1040—YES), the pilot may send the pilot's authentication token to the security manager (S1050). The security manager may request the verification of the received pilot's authentication token from the authentication server (S1060). The security manager may request the verification from the authentication server by transmitting the verification request data on the pilot's authentication token to the authentication server. The authentication server may verify the pilot's authentication token (S1070).

The authentication server may determine whether the pilot's authentication token is verified (S1080). When the pilot's authentication token is not verified (S1080—NO), the mutual authentication between the pilot and the security manager may fail. When the pilot's authentication token is verified (S1080—YES), the pilot and the security manager may share the session key and a message authentication code (MAC) key using the hybrid encryption technique (S1090).

The authentication request, key sharing, and token exchange between the pilot and the security manager may be performed on the C2 link. The authentication request, verification procedure, and token exchange between the pilot and the authentication server may be performed on the internet network. The authentication request, verification procedure, and token exchange between the security manager and the authentication server may be performed on the internet network. Thus, in order for an attacker to successfully attack, two conditions should be satisfied. The first condition is that the attacker should impersonate the pilot by stealing the pilot's certificate. The second condition is that the attacker should be in the cockpit according to the flight time.

The user and the security manager may encrypt data related to aircraft operation using the session key. The user and the security manager may transmit the encrypted data related to the aircraft operation to each other. An encrypted transmission data format may include encrypted data, freshness value, MAC, etc. An attacker's replay attack may be blocked through the freshness value. By encrypting the data related to the aircraft operation, eavesdropping by an attacker is prevented. Further, the attacker may not manipulate the data related to the aircraft operation. The data related to the aircraft operation may include the position of the aircraft, the amount of fuel, the speed, the direction, the surrounding environment, and the distance to another aircraft. The data related to the aircraft operation may correspond to data related to remote control.

Figure 11:
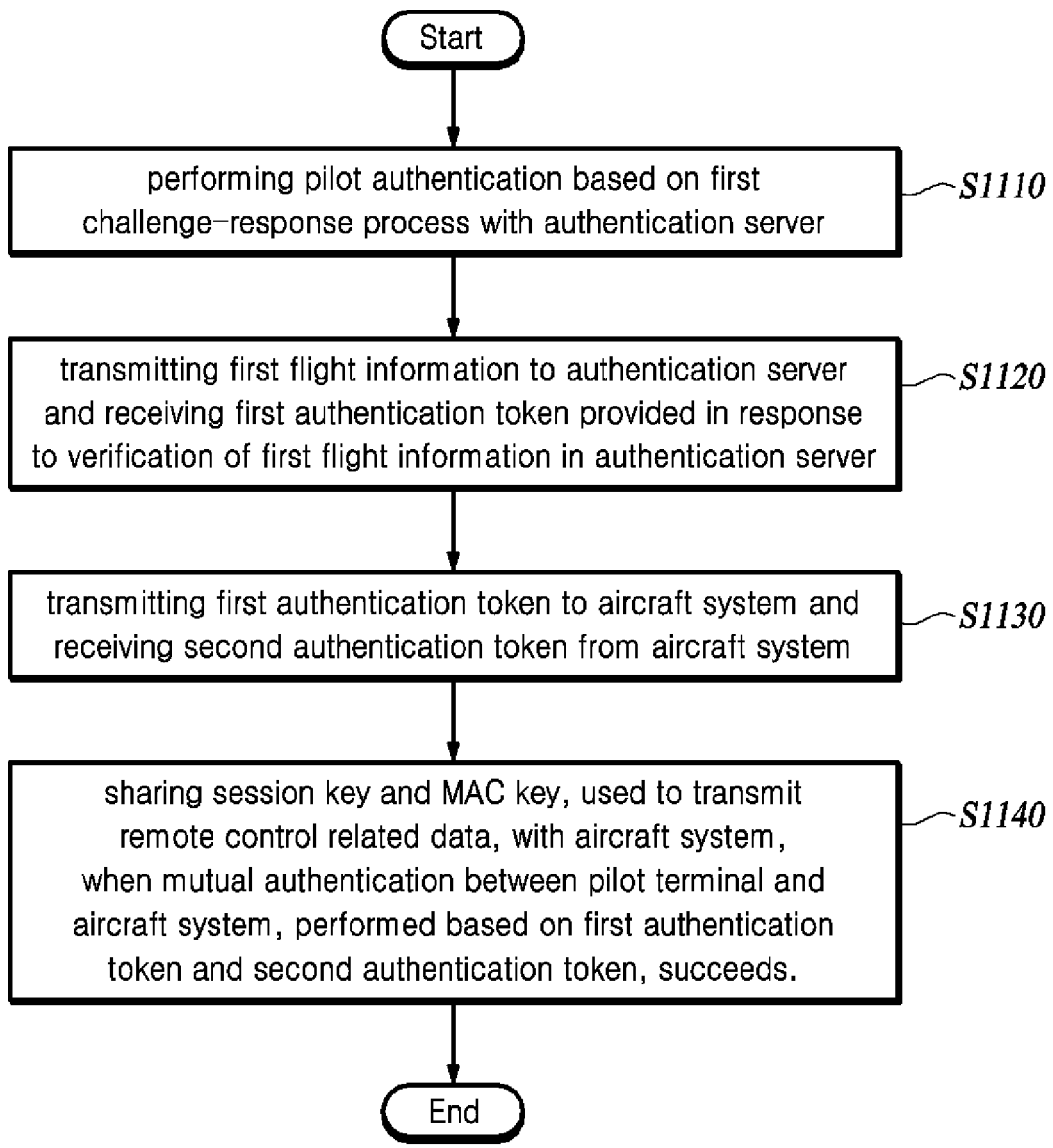
FIG. 11 is a diagram for describing an authentication method for defending against attacks on a UAM aircraft performed by a pilot terminal, according to an embodiment of the present disclosure.

FIG. 11 is a diagram for describing an authentication method performed by a pilot terminal for defending against attacks on a UAM aircraft, according to an embodiment of the present disclosure.

Referring to FIG. 11, the pilot terminal may assist the pilot in remotely controlling the aircraft. The pilot terminal may perform pilot authentication based on a first challenge-response process with the authentication server (S1110). The pilot terminal may transmit first flight information to the authentication server and receive a first authentication token provided in response to the verification of the first flight information in the authentication server (S1120). The pilot terminal may transmit the first authentication token to the aircraft system and receive a second authentication token from the aircraft system (S1130). The second authentication token may correspond to that provided to the aircraft system in response to verification by the authentication server for the second flight information and may be transmitted by the aircraft system to the authentication server when authentication for the security manager boarding the aircraft succeeds based on a second challenge-response process performed between the aircraft system and the authentication server.

When mutual authentication between the pilot terminal and the aircraft system, which is performed based on the first authentication token and the second authentication token, succeeds, the pilot terminal may share the session key and the MAC key, which will be used to transmit remote control related data, with the aircraft system (S1140). The pilot terminal may transmit or receive the remote control related data to or from the aircraft system. The pilot terminal may be communicatively connected to the authentication server through the internet network, and be communicatively connected to the aircraft system through the C2 link. The mutual authentication between the pilot terminal and the aircraft system may be performed before the aircraft takes off or flies.

Each of the first flight information and the second flight information may include at least one of pilot information, cockpit information, aircraft information, and flight time information. Each of the first authentication token and the second authentication token may include at least one of pilot information, cockpit information, aircraft information, and expiration date information. The session key and the MAC key may be shared using a hybrid encryption scheme. Remote control related data may be encrypted using the session key. The remote control related data may be transmitted in a predetermined data format, and the predetermined data format may include at least one of a freshness value and a MAC.

Figure 12:
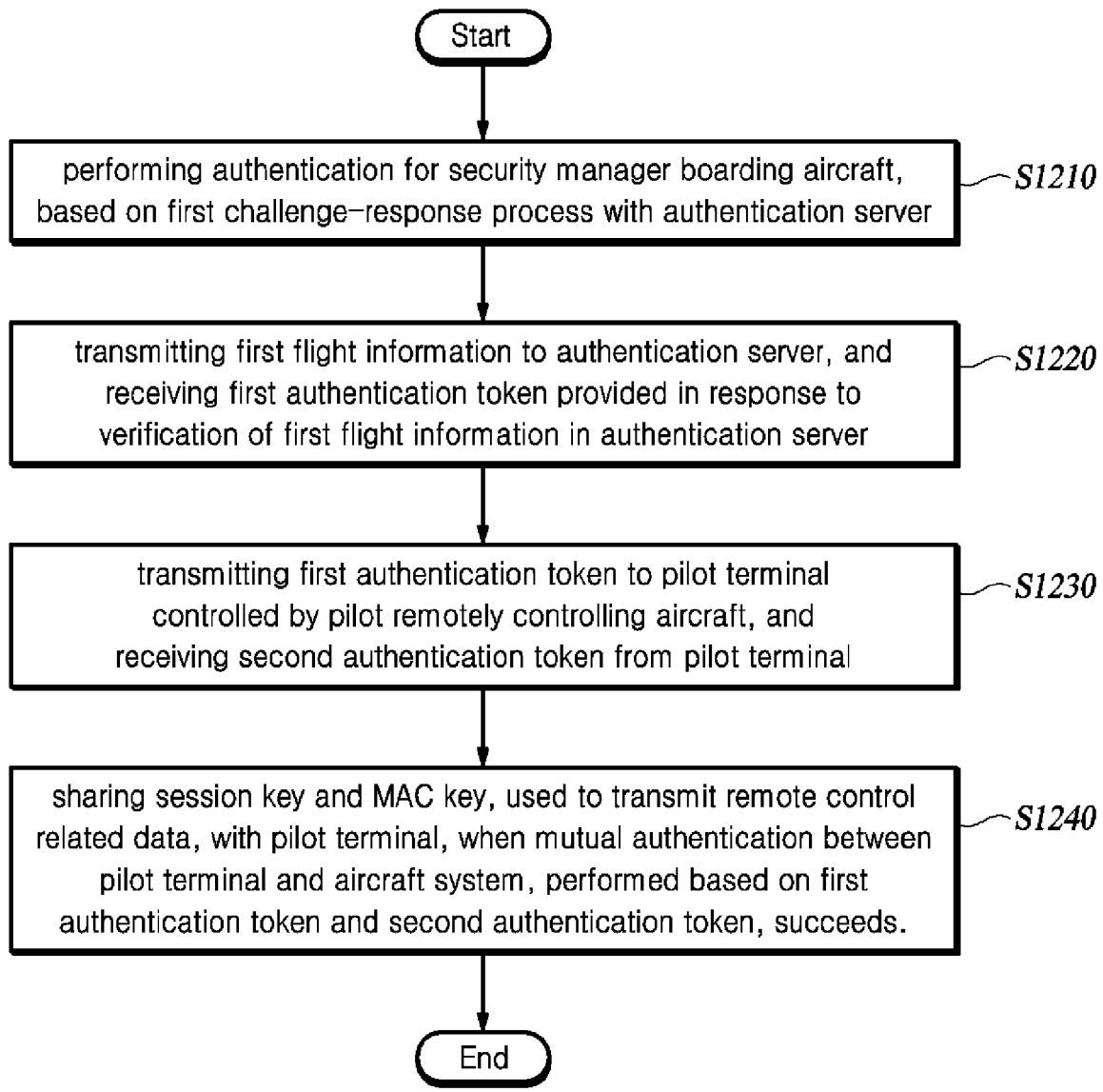
FIG. 12 is a diagram for describing an authentication method for defending against attacks on a UAM aircraft performed by an aircraft system, according to an embodiment of the present disclosure.

FIG. 12 is a diagram for describing an authentication method performed by an aircraft system for defending against attacks on a UAM aircraft, according to an embodiment of the present disclosure.

Referring to FIG. 12, the aircraft system may assist the pilot in remotely controlling the aircraft. The aircraft system may perform authentication for the security manager boarding the aircraft based on a first challenge-response process with the authentication server (S1210). The aircraft system may transmit first flight information to the authentication server and receive a first authentication token provided in response to the verification of the first flight information in the authentication server (S1220). The aircraft system may transmit the first authentication token to the pilot terminal controlled by the pilot who remotely controls the aircraft and receive a second authentication token from the pilot terminal (S1230). The second authentication token may correspond to that provided to the pilot terminal in response to verification by the authentication server for the second flight information and may be transmitted by the pilot terminal to the authentication server when authentication for the pilot succeeds based on a second challenge-response process performed between the pilot terminal and the authentication server.

When mutual authentication between the pilot terminal and the aircraft system, which is performed based on the first authentication token and the second authentication token, succeeds, the aircraft system may share the session key and the MAC key, which will be used to transmit remote control related data, with the pilot terminal (S1240). The aircraft system may transmit or receive the remote control related data to or from the pilot terminal. The aircraft system may be communicatively connected to the authentication server through the internet network and may be communicatively connected to the pilot terminal through the C2 link.

Each of the first flight information and the second flight information may include at least one of pilot information, cockpit information, aircraft information, and flight time information. Each of the first authentication token and the second authentication token may include pilot information, cockpit information, aircraft information, and expiration date information. The session key and the MAC key may be shared using a hybrid encryption scheme. Remote control related data may be encrypted using the session key. The remote control related data may be transmitted in a predetermined data format, and the predetermined data format may include at least one of a freshness value and a MAC.

Each component of the apparatus or method according to embodiments of the present disclosure may be implemented as hardware or software or a combination of hardware and software. Further, the function of each component may be implemented as software and a microprocessor may be implemented to execute the function of software corresponding to each component.

Various implementations of systems and techniques described herein may be realized in a digital electronic circuit, an integrated circuit, a field programmable gate array (FPGA), an application specific integrated circuit (ASIC), computer hardware, firmware, software, and/or a combination thereof. These various implementations may include an implementation where one or more computer programs are executable on a programmable system. The programmable system includes a storage system, at least one input device, and at least one programmable processor (which may be a special-purpose processor or a general-purpose processor) coupled to receive and transmit data and instructions from and to at least one output device. The computer programs (also known as programs, software, software applications, or code) contain commands for a programmable processor and are stored in a "computer-readable recording medium".

The computer-readable recording medium includes all types of recording devices in which data readable by a computer system is stored. Such a computer-readable recording medium may be a non-volatile or non-transitory medium, such as a ROM, a CD-ROM, a magnetic tape, a floppy disk, a memory card, a hard disk, a magneto-optical disk, or a storage device, and may further include a transitory medium such as a data transmission medium. In addition, the computer-readable recording medium may be distributed in a computer system connected via a network, so that computer-readable codes may be stored and executed in a distributed manner.

The flowcharts/timing diagrams of embodiments of the present specification describe that processes are sequentially executed, but this is merely illustrative of the technical idea of embodiments of the present disclosure. In other words, since it is apparent to those skilled in the art that an order described in the flowcharts/timing diagrams may be changed or one or more processes may be executed in parallel without departing from the essential characteristics of an embodiment of the present disclosure, the flowcharts/timing diagrams are not limited to a time-series order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method performed by a pilot terminal assisting a pilot to remotely control an aircraft, the method comprising:
    performing pilot authentication based on a first challenge-response process with an authentication server;
    transmitting first flight information to the authentication server;
    receiving a first authentication token provided in response to verification of the first flight information in the authentication server;
    transmitting the first authentication token to an aircraft system;
    receiving a second authentication token from the aircraft system, the second authentication token being transmitted by the aircraft system to the authentication server when authentication for a security manager boarding the aircraft succeeds based on a second challenge-response process performed between the aircraft system and the authentication server, wherein the second authentication token corresponds to that provided to the aircraft system in response to verification by the authentication server for second flight information; and
    sharing a session key and a message authentication code (MAC) key, which will be used to transmit remote control related data, with the aircraft system, when mutual authentication between the pilot terminal and the aircraft system, which is performed based on the first authentication token and the second authentication token, succeeds, wherein the remote control related data is encrypted using the session key and transmitted in a predetermined data format, and the predetermined data format comprises a freshness value or a message authentication code MAC).

2. The method of claim 1, wherein the pilot terminal is communicatively connected to the authentication server through an internet network and is communicatively connected to the aircraft system through a command and control link.

3. The method of claim 1, wherein each of the first flight information and the second flight information comprises at least one of pilot information, cockpit information, aircraft information, or flight time information.

4. The method of claim 1, wherein each of the first authentication token and the second authentication token comprises at least one of pilot information, cockpit information, aircraft information, or expiration date information.

5. The method of claim 1, wherein the session key and the MAC key are shared using a hybrid encryption scheme.

6. The method of claim 1, wherein the mutual authentication between the pilot terminal and the aircraft system is performed before the aircraft takes off or flies.

7. The method of claim 1, further comprising transmitting or receiving the remote control related data to or from the aircraft system for takeoff or flight of the aircraft.

8. A method performed by an aircraft system assisting a pilot to remotely control an aircraft, the method comprising:
    performing authentication for a security manager boarding the aircraft based on a first challenge-response process with an authentication server;
    transmitting first flight information to the authentication server;
    receiving a first authentication token provided in response to verification of the first flight information in the authentication server;
    transmitting the first authentication token to a pilot terminal controlled by the pilot who remotely controls the aircraft;
    receiving a second authentication token from the pilot terminal, the second authentication token being transmitted by the pilot terminal to the authentication server when authentication for the pilot succeeds based on a second challenge-response process performed between the pilot terminal and the authentication server, wherein the second authentication token corresponds to that provided to the pilot terminal in response to verification by the authentication server for second flight information; and
    sharing a session key and a message authentication code (MAC) key, which will be used to transmit remote control related data, with the pilot terminal, when mutual authentication between the pilot terminal and the aircraft system, which is performed based on the first authentication token and the second authentication token, succeeds, wherein the remote control related data is encrypted using the session key and transmitted in a predetermined data format, and the predetermined data format comprises a freshness value or a message authentication code MAC).

9. The method of claim 8, wherein the aircraft system is communicatively connected to the authentication server through an internet network and is communicatively connected to the pilot terminal through a command and control link.

10. The method of claim 9, wherein each of the first flight information and the second flight information comprises at least one of pilot information, cockpit information, aircraft information, or flight time information.

11. The method of claim 9, wherein each of the first authentication token and the second authentication token comprises at least one of pilot information, cockpit information, aircraft information, or expiration date information.

12. The method of claim 9, wherein the session key and the MAC key are shared using a hybrid encryption scheme.

13. The method of claim 9, wherein the mutual authentication between the pilot terminal and the aircraft system is performed before the aircraft flies or takes off.

14. The method of claim 9, further comprising transmitting or receiving the remote control related data to or from the pilot terminal for takeoff or flight of the aircraft.

15. A pilot terminal assisting a pilot to remotely control an aircraft, the pilot terminal comprising:
a memory; and
a processor configured to:
perform pilot authentication based on a first challenge-response process with an authentication server,
transmit first flight information to the authentication server and receive a first authentication token provided in response to verification of the first flight information in the authentication server;
transmit the first authentication token to an aircraft system and receive a second authentication token from the aircraft system, wherein the second authentication token corresponds to that provided to the aircraft system in response to verification by the authentication server for second flight information and is transmitted by the aircraft system to the authentication server when authentication for a security manager boarding the aircraft succeeds based on a second challenge-response process performed between the aircraft system and the authentication server; and
share a session key and a message authentication code (MAC) key, which will be used to transmit remote control related data, with the aircraft system, when mutual authentication between the pilot terminal and the aircraft system, which is performed based on the first authentication token and the second authentication token, succeeds, wherein the remote control related data is encrypted using the session key and transmitted in a predetermined data format, and the predetermined data format comprises a freshness value or a message authentication code (MAC).

16. An aircraft system assisting a pilot to remotely control an aircraft, the aircraft system comprising:
a memory; and
a processor configured to:
perform authentication for a security manager boarding the aircraft, based on a first challenge-response process with an authentication server;
transmit first flight information to the authentication server and receive a first authentication token provided in response to verification of the first flight information in the authentication server;
transmit the first authentication token to a pilot terminal controlled by the pilot who remotely controls the aircraft and receive a second authentication token from the pilot terminal, wherein the second authentication token corresponds to that provided to the pilot terminal in response to verification by the authentication server for second flight information and is transmitted by the pilot terminal to the authentication server when authentication for the pilot succeeds based on a second challenge-response process performed between the pilot terminal and the authentication server; and
share a session key and a message authentication code (MAC) key, which will be used to transmit remote control related data, with the pilot terminal, when mutual authentication between the pilot terminal and the aircraft system, which is performed based on the first authentication token and the second authentication token, succeeds, wherein the remote control related data is encrypted using the session key and transmitted in a predetermined data format, and the predetermined data format comprises a freshness value or a message authentication code (MAC).

* * * * *